United States Patent [19]

Nelson

[11] 4,298,056
[45] Nov. 3, 1981

[54] HEAT PUMP SETBACK TEMPERATURE CONTROL WITH COLD WEATHER OVERRIDE

[75] Inventor: Lorne W. Nelson, Bloomington, Minn.

[73] Assignee: Honeywell Inc., Minneapolis, Minn.

[21] Appl. No.: 114,028

[22] Filed: Jan. 21, 1980

[51] Int. Cl.³ .............................................. F25B 29/00
[52] U.S. Cl. ....................................... 165/12; 165/28; 165/29; 62/157; 236/91 E
[58] Field of Search ............... 165/12, 28, 29; 62/160, 62/157; 236/46 R, 91 D, 91 E

[56] References Cited

PUBLICATIONS

"The Effects of Reduced Indoor Temperature and Night Setback on Energy Consumption of Residential Heat Pumps" by R. D. Ellison, ASHRAE Journal, Feb. 1977.
"Energy Savings through Thermostat Setback with Residential Heat Pumps" by Dr. C. E. Bullock, ASHRAE Transactions 1978.

*Primary Examiner*—Albert W. Davis
*Assistant Examiner*—Margaret A. Focarino
*Attorney, Agent, or Firm*—Clyde C. Blinn

[57] ABSTRACT

A multistage timer control setback thermostat control system maintaining a normal temperature in a space and during selected time periods a reduced temperature wherein a first stage is a refrigeration heat pump, the operation of which is affected by outdoor temperature, and a second stage is an auxiliary electrical heating source. An outdoor temperature responsive means is connected in the control system to maintain the heat pump energized during the space temperature setback period if the outdoor temperature is below some predetermined value. Additionally, the indoor thermostat has a high limit temperature responsive means for terminating the operation of the heat pump should the space temperature exceed some predetermined value during the space temperature setback period.

5 Claims, 5 Drawing Figures

HEAT PUMP SETBACK TEMPERATURE CONTROL WITH COLD WEATHER OVERRIDE

BACKGROUND AND SUMMARY OF THE INVENTION

Multistage thermostats have been used for a long time to control stages of heating wherein a refrigeration heat pump is used for one stage and auxiliary electrical strip heat is used for other stages. Also there has been a continual need for protection for refrigeration apparatus when exposed to cold temperatures such as electrical heaters for the outdoor compressor unit for maintaining the unit warm during the inoperative period. When heat pump apparatus is used for heating as the first stage in a multistage control system, during normal temperature control at a high heating load with low outdoor temperatures, the compressor is almost continually operated.

When a multistage thermostat control system is used with a night setback thermostat, the controlled temperature desired in the space is setback to some lower level during a selected period of time. During a portion of the setback time, there may be no call for heat and thus the refrigeration heat pump can remain idle for an extended period of time before a call for heat brings it into operation. During low outdoor temperatures, the starting of the heat pump after an extended inoperative period can result in damage. Additionally, if the space temperature is allowed to drop for a night setback during a heavy heating load with a low outdoor temperature, the pickup load to bring the temperature back to normal is extremely great. The control system may by necessity need to bring on the more expensive electrical strip heat for a pickup operation.

The present invention provides for a means responsive to outdoor temperature to maintain the refrigeration heat pump in operation when the outdoor temperature drops below some predetermined value during the setback time period. During light loads even though there is a low outdoor temperature, the continuously energized heat pump may result in an increased space temperature; therefore, the invention contemplates the use of a temperature responsive element mounted in the space to override the continuous energization of the heat pump should the space temperature exceed some predetermined value during the setback period.

DESCRIPTION OF THE PREFERRED EMBODIMENT

Figure 1:
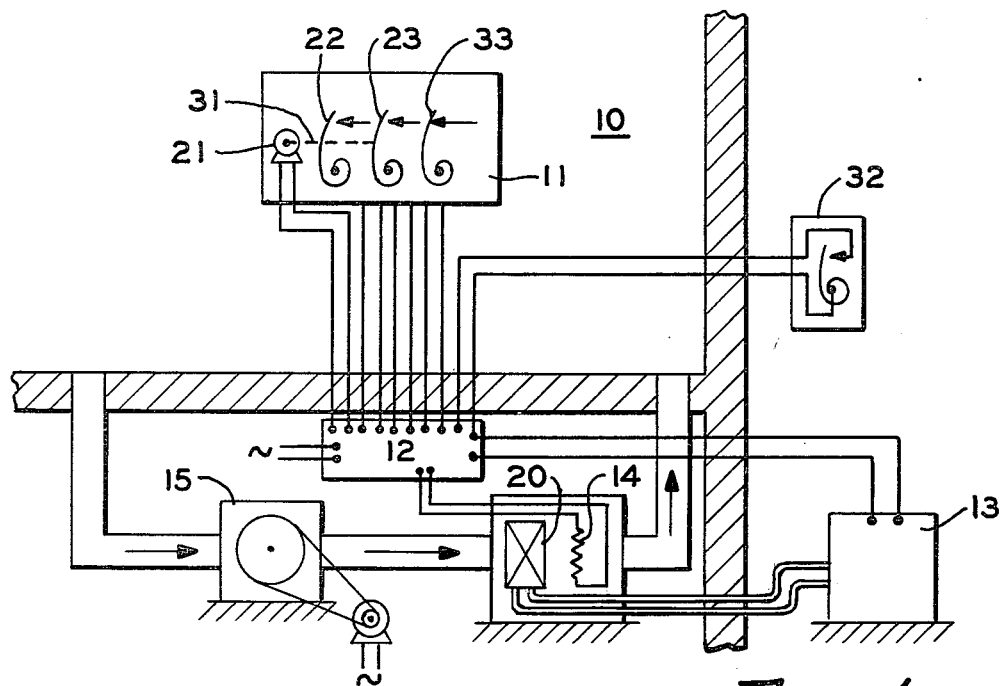
FIG. 1 is a schematic representation of a multistage temperature control system.

Referring to FIG. 1, a heating system is shown for furnishing heat to a space 10 to maintain a temperature in the space selected by a multistage electric clock thermostat 11. Thermostat 11 is connected to a control panel 12 which is adapted to control a refrigeration heat pump compressor unit or heat source 13 and an auxiliary electric heater or heat source 14 for furnishing heat to space 10 by heating air which is circulated by a fan 15. Upon the operation of refrigeration compressor 13 which is outside and exposed to the low outside air temperature as in the heat pump system of the Waldemar W. Liebrecht U.S. Pat. No. 3,093,997, issued June 18, 1963, heat is removed from the outdoor air and supplied to the heat exchanger 20.

Figure 2:
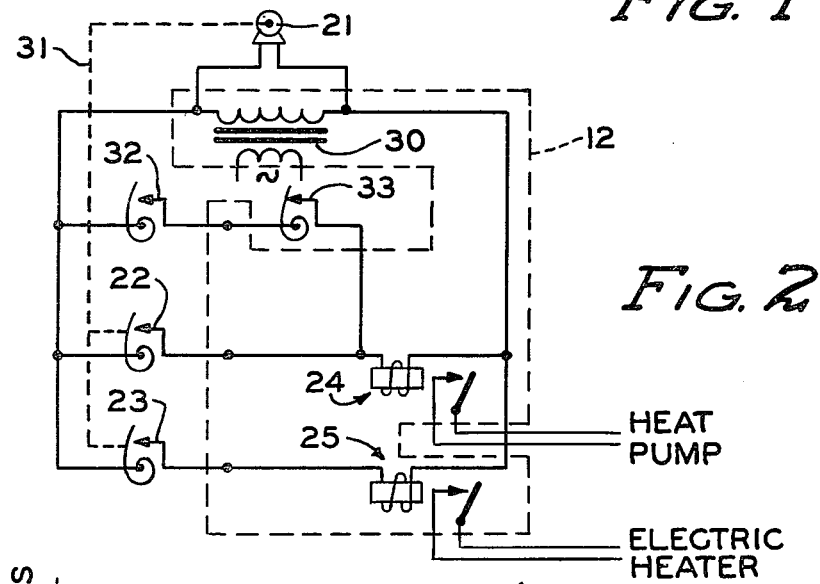
FIG. 2 is the circuit of the apparatus of FIG. 1.

Thermostat 11 is an electric clock thermostat of the type shown in the Carl G. Kronmiller U.S. Pat. No. 2,558,617, issued June 26, 1951, having a clock or timer motor 21 and at least two temperature responsive switch means or thermostat elements 22 and 23. A normal daytime temperature can be selected and the control temperatures of switch or control means 22 and 23 set at two temperatures, such as 68° F. and 67° F. During a certain time period the temperature maintained in space 10 can be reset to a nighttime temperature for comfort and saving of energy. During the nighttime setting switch means 22 and 23 may be reset to a control temperature of 65° F. and 64° F. Obviously other configurations of a multistage temperature setback control system to accomplish the operation of thermostats 22 and 23 might be used; such as, a single bimetal unit with two separate mercury switches having a temperature differential between the operation of each to provide the two stage operation. A clock connection would be used to change the control temperature of both switches for night setback. Also an electronic bridge circuit with a single temperature responsive element could be used as will be described later with FIGS. 4 and 5. Thermostat 22 controls a relay 24, as shown in FIG. 2, for energizing refrigeration heat pump or compressor 13. Thermostat 23 controls the operation of a relay 25 for energizing electric heater 14. These thermostats and relays are energized through a circuit from the secondary of transformer 30. At certain selected time periods, motor 21 can reset the control point of thermostat 22 and 23 through a conventional mechanism or linkage 31.

As shown in FIG. 1, an outdoor temperature responsive switch means or thermostat 32 is connected to control panel 12. The outdoor thermostat closes at some predetermined low temperature such as around 35° F. Another temperature responsive means, thermostat switch or control means 33 of thermostat 11 is connected to control panel 12. Control means 33 might be another output of an electronic bridge circuit as mentioned with control means 22 and 23. Thermostats 32 and 33 are connected in series to bypass thermostat 22, as shown in FIG. 2, to bring about the energization of relay 24 and thus the operation of the heat pump when the outdoor temperature drops below the 36° F. level. Thermostat 33 is set at some high limit such as 72° to open and terminate the heat pump circuit should the space temperature rise to an abnormally high value due to a large amount of internal heat.

Figure 4:
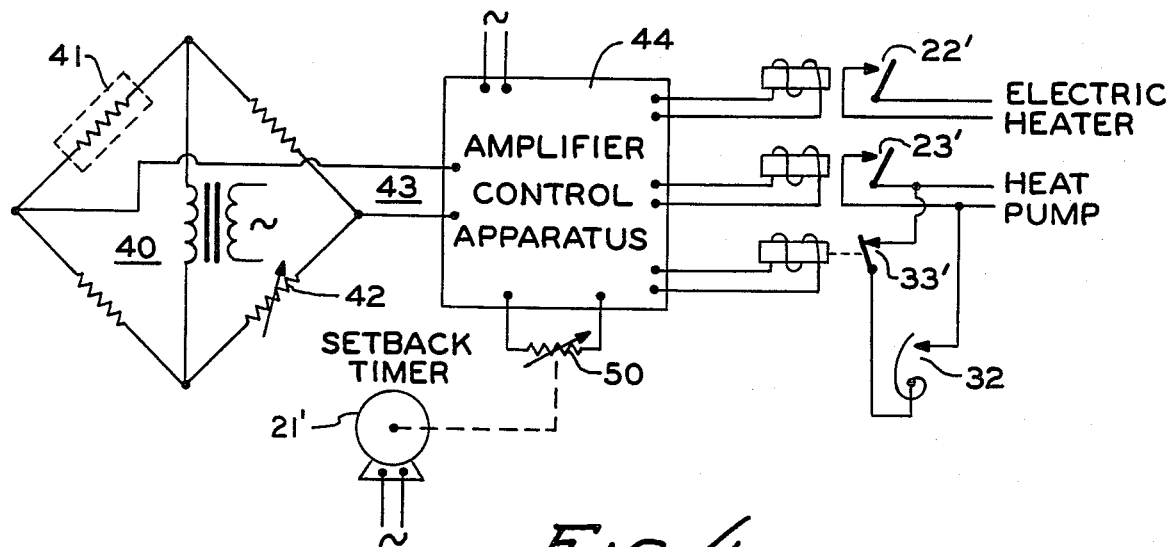
FIG. 4 is a second embodiment.
Figure 5:
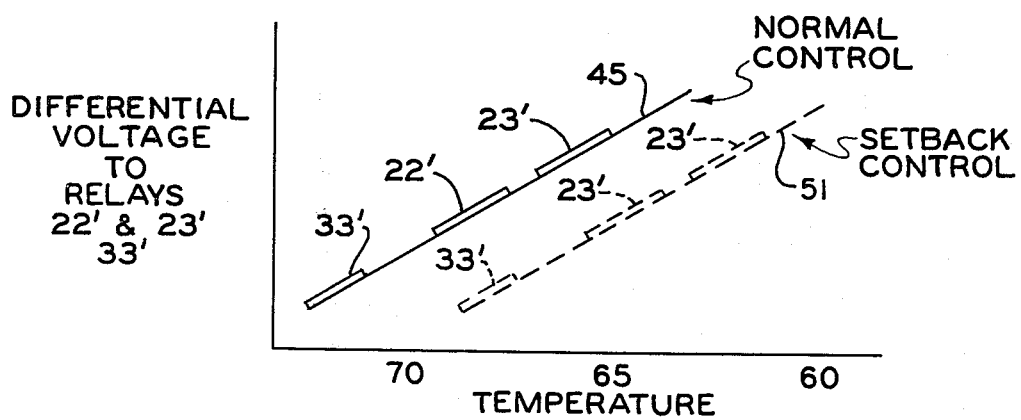
FIG. 5 is a graphical representation of the operation of FIG. 4.

Another embodiment of the present invention is shown in FIG. 4. An electronic bridge 40 has a space temperature responsive element 41 and an adjustable element 42 for calibration to change the control temperature of the bridge circuit output at 43. The bridge circuit is connected to an amplifier control apparatus 44 of the type disclosed in the Merlin E. Demaray et al U.S. Pat. No. 4,136,732, issued Jan. 30, 1979, for controlling relays 22', 23' and 32'. The relays 22' and 23' are controlled through a differential by a voltage output shown by the graphical representation in FIG. 5 of curves 45 and 51. Curve 51 is shifted from 45 through an electrical circuit by setback timer 21' upon the adjustment of a resistor 50 to provide for a change in the control temperature. Relay 33' is a high limit temperature control and may be affected by the setback adjustment of resistor 50. Relay 33' operates slightly below the voltage of relay 22' so that regardless of the setback a high limit control exists. Outdoor thermostat 32 overrides the effect of relay 33' to provide the continuous operation of the heat pump at low outdoor temperatures unless the space temperature exceeds a high limit temperature.

OPERATION OF THE PREFERRED EMBODIMENT

Figure 3:
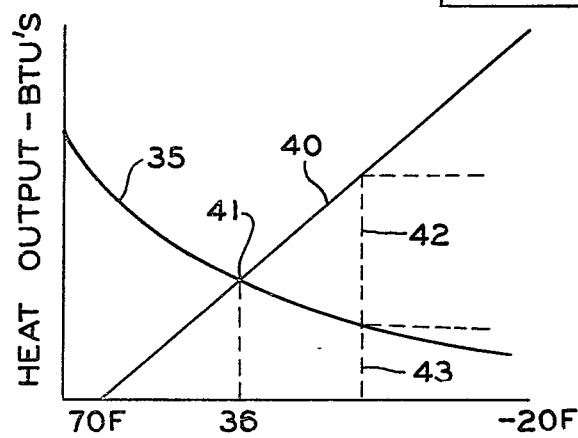
FIG. 3 is a graphical representation of the operation of the invention.

Referring to FIG. 3, a graphical representation of a typical installation is shown with the British Thermal Units (BTU) or heat units plotted against the outdoor temperature in degrees Fahrenheit. Curve 35 represents the heat output of the refrigeration heat pump at exchanger 20, which drops as the outdoor temperature drops due to the coefficient of performance of the heat pump. Line 40 represents the heating requirement of space 10 which might be a home or dwelling in which the apparatus of FIG. 1 is being used to supply heat during the winter months. The intersection of curve 35 and line 40 at point 41 represents the balance point for the system which in this case is around 36° F. At any outdoor temperature below the balance point, upon a resetting of the space temperature during nighttime, when morning pickup is desired, the pickup will require auxiliary heating by the more expensive strip heater 14. During this temperature resetting period of time, for best economy it is desired to maintain the refrigeration heat pump energized to reduce the amount of auxiliary heat from heater 14 which is necessary to reset the temperature of the space to the daytime or normal temperature after the setback time elapses and a pickup is needed. Dotted line 42 between the curves 40 and 35 represents the auxiliary heat requirement which would be necessary to maintain the heating requirement of the space at that particular outdoor temperature assuming that the heat pump was operating a full amount to supply the heating output as shown by line 43.

As the outdoor temperature drops below the 35° F. temperature, thermostat 32 closes to maintain the heat pump continuously energized during the setback period of time. If there is sufficient heat output from the heat pump and the internal heat in the building which might come about by lights or cooking and people to exceed the normal day setpoint of the temperature, limiting thermostat 33 opens to turn off the heat pump. With such an operation of the heat pump continuously during the cold weather below 35° F., upon morning pickup the amount of heat requirement from the auxiliary heat is minimized to increase the efficiency of the heating system. A similar operation is accomplished with the embodiment of FIGS. 5 and 6 except space temperature responsive element 41 is a single element.

Many compressor manufacturers also have been concerned with extended off periods of the compressor during cold weather which can lead to premature failure of the heat pump. The continuous energization of the heat pump by thermostat 32 at low outdoor temperatures with the exception when the high limit thermostat 33 might open not only increases the efficiency of the system but extends the life of the heat pump.

The embodiments of the invention in which an exclusive property or right is claimed are defined as follows:

1. An improvement in a multistage setback time controlled thermostat control system for maintaining a normal temperature and during selected time periods a reduced temperature in a space wherein a first stage is adapted to control a refrigeration heat pump for furnishing heat to the space from the outside air and at least a second stage is adapted to control an auxiliary heating source for furnishing heat to the space, the improvement comprising, an outdoor temperature responsive means adapted to be connected to said control system to maintain the refrigeration heat pump operative when the outdoor temperature is below a predetermined value independent of said first stage whereby the refrigeration heat pump is not allowed to stand inoperative at low outdoor temperatures.

2. In a multistage temperature setback control system comprising space temperature responsive means, control means being adapted to control a refrigeration heat pump system and at least one stage of an auxiliary heat source, means associated with said space temperature responsive means and said control means to maintain a normal temperature and at selected time periods to maintain a lower temperature at other selected time periods, outdoor temperature responsive means, and connection means connecting said outdoor temperature responsive means to said control means to energize the refrigeration heat pump when the outdoor temperature is below a predetermined value.

3. The invention of claim 2 comprising further means associated with said space temperature responsive means to terminate the operation of the refrigeration heat pump when the space temperature exceeds a predetermined temperature.

4. The invention of claim 2 wherein the refrigeration heat pump has a compressor and an indoor and outdoor heat exchanger wherein the efficiency decreases with the lowering of the outdoor temperature and its operating life is extended when the compressor is not allowed to stop when the outdoor temperature is below said first predetermined value, and the auxiliary heating heat source is electrical heating apparatus, which when used during pickup periods of operation after a setback time period, when the space temperature is at the setback temperature, to restore the space temperature to the normal temperature, is more expensive to operate than a refrigeration heat pump.

5. The invention of claim 1 with a further improvement comprising, means associated with the thermostat control system adopted to terminate the operation of the refrigeration heat pump when the space temperature exceeds a predetermined value.

* * * * *